United States Patent [19]

Briden

[11] Patent Number: 4,605,698

[45] Date of Patent: Aug. 12, 1986

[54] POLYFUNCTIONAL AZIRIDINES FOR USE IN CROSSLINKING APPLICATIONS

[75] Inventor: Frank C. Briden, Morristown, N.J.

[73] Assignee: Diamond Shamrock Chemicals Company, Dallas, Tex.

[21] Appl. No.: 775,430

[22] Filed: Sep. 12, 1985

Related U.S. Application Data

[62] Division of Ser. No. 513,454, Jul. 13, 1983, Pat. No. 4,563,307.

[51] Int. Cl.$^4$ ............................................. C08L 33/02
[52] U.S. Cl. ..................................... 524/559; 524/561; 524/591; 524/601; 525/305; 525/375; 525/437; 525/440
[58] Field of Search ............... 525/375, 305, 437, 440; 524/561, 562, 559, 591, 601

[56] References Cited

U.S. PATENT DOCUMENTS

| | | | |
|---|---|---|---|
| 2,596,200 | 5/1952 | Bestian | 260/239 E |
| 3,165,375 | 1/1965 | Tesoro | 8/127.6 |
| 3,197,463 | 7/1965 | Tesoro et al. | 260/239 R |
| 3,285,798 | 11/1966 | Tesoro | 161/92 |
| 3,338,885 | 8/1967 | Coker et al. | 260/239 E |
| 3,507,837 | 4/1970 | Hidinger, Jr. | 525/375 X |
| 3,597,146 | 8/1971 | Tesoro | 8/115.7 |
| 3,726,862 | 4/1973 | Coker et al. | 260/239 E |
| 3,763,132 | 10/1973 | Meiser, Jr. | 525/375 X |
| 3,806,498 | 4/1974 | Wilson et al. | 525/375 |
| 3,974,131 | 8/1976 | Puskas et al. | 526/263 |
| 3,985,920 | 10/1976 | Travis | 427/207 A |
| 4,167,414 | 9/1979 | Morgan | 96/87 R |
| 4,278,578 | 7/1981 | Carpenter | 524/272 |
| 4,382,135 | 5/1983 | Sinka et al. | 526/301 |
| 4,418,164 | 11/1983 | Logullo, Sr. et al. | 523/207 |

FOREIGN PATENT DOCUMENTS

| | | |
|---|---|---|
| 26868 | 2/1983 | Japan . |
| 26869 | 2/1983 | Japan . |
| 1054635 | 1/1967 | United Kingdom . |

*Primary Examiner*—Theodore E. Pertilla
*Attorney, Agent, or Firm*—Neal T. Levin

[57] ABSTRACT

Polyfunctional aziridines useful in crosslinking applications have been developed which are reaction products of (1) ethylene imine and (2) acrylates of alkoxylated trimethylol propane, neopentyl glycol, pentaerythritol, bis phenol A, bis phenol F and glycerol, each having a degree of alkoxylation of from about 2 to about 12. Examples are the bis aziridine of the diacrylate of the adduct of neopentyl glycol and 2 moles of ethylene oxide and the tris aziridine of the triacrylate of the adduct of trimethylol propane and 3 moles of ethylene oxide.

11 Claims, No Drawings

4,605,698

POLYFUNCTIONAL AZIRIDINES FOR USE IN CROSSLINKING APPLICATIONS

This is a division of application Ser. No. 513,454 filed July 13, 1983 now U.S. Pat. No. 4,563,307 issued Jan. 7, 1986.

BACKGROUND OF THE INVENTION

1. Field of the Invention

This invention relates to polyfunctional aziridines for use in crosslinking applications which are the reaction products of ethylene iminie and acrylates of alkoxylated trimethyol propane, neopentyl glycol, pentaerythritol, bis phenol A, bis phenol F and glycerol.

2. Description of the Prior Art

Polyfunctional aziridines have been shown to be useful as crosslinking agents in various types of coating systems such as carboxylated acrylics, vinyl-acetate, carboxylated urethanes and styrene acrylics. Commercially available polyfunctional aziridines are trifunctional in character and are reaction products of ethylene imine or propylene imine with trimethylol propane triacrylate and ethylene imine with pentaerythritol triacrylate. They are effective low temperature crosslinking agents when added to a coat system in amounts of 0.2 to 5.0% by weight of total formula.

The choice of crosslinking agent used in a coating system has a significant effect on the preparation of the coating system as well as on the overall properties of the cured coating. Factors such as water solvency, viscosity, and functionality will have a bearing on the ease of preparing the coating.

Regarding the previously mentioned polyfunctional aziridines which are used commercially, these materials are effective crosslinking agents but tend to be low in water solubility, have negative features in toxicity and are poor in corrosion, adhesion and humidity resistance.

The above and other polyfunctional aziridines are, for example, described in the following patents:

| | | |
|---|---|---|
| 2,596,200 | Bestian | May 13, 1952 |
| 3,165,375 | Tesoro | January 12, 1965 |
| 3,197,463 | Tesoro et al | July 27, 1965 |
| 3,285,798 | Tesoro | November 15, 1966 |
| 3,338,885 | Coker et al | August 29, 1967 |
| 3,597,146 | Tesoro | August 3, 1971 |
| 3,726,862 | Coker et al | April 10, 1973 |

Aqueous coating composition containing aziridine crosslinking agents are described in U.S. Pat. No. 4,278,578—Carpenter, July 14, 1981.

SUMMARY OF THE INVENTION

New polyfunctional aziridines which can be used as crosslinking agents in various types of coating systems are provided for. They provide improved physical properties of the crosslinked coating with respect to moisture resistance, adhesion, ultraviolet light stability, alkali resistance, corrosion resistance and gloss.

The polyfunctional aziridines of this invention are aziridine derivatives of particular acrylates of alkoxylated polyols having a degree of alkoxylation of from about 2 to about 12.

DESCRIPTION OF THE PREFERRED EMBODIMENTS

Polyfunctional Aziridines

More specifically, the polyfunctional aziridines are bis and tris aziridines of di and tri acrylates of alkoxylated polyols selected from the group consisting of neopentyl glycol, 2,2'-bis(p-hydroxy-phenyl)propane (bisphenol A), 2,2'-bis(p-hydroxyphenyl)methane (bisphenol F), glycerol, trimethylolpropane and pentaerythritol having from about 2 to about 12 moles of one or a mixture of an alkylene oxide selected from the group consisting of ethylene oxide and propylene oxide. Preferably, from about 2 to about 8 moles of one or a mixture of an alkylene oxide selected from the group consisting of ethylene oxide and propylene oxide can be used.

Examples of polyfunctional aziridines are:
the bis aziridine of the diacrylate of the adduct of neopentyl glycol and 2 moles of ethylene oxide,
the bis aziridine of the diacrylate of the adduct of neopentyl glycol and 2 moles of propylene oxide,
the tris aziridine of the triacrylate of the adduct of glycerol and 3.8 moles of propylene oxide,
the tris aziridine of the triacrylate of the adduct of trimethylol propane and 3 moles of ethylene oxide,
the tris aziridine of the triacrylate of the adduct of trimethylol propane and 3 moles of propylene oxide,
the tris aziridine of the triacrylate of the adduct of pentaerythritol and 4.7 moles of propylene oxide,
the bis aziridine of the diacrylate of the adduct of bis phenol A and 4 moles of ethylene oxide.

In other examples, mixed ethylene oxide, propylene oxide can be used.

Preparation of Polyfunctional Aziridines

The polyfunctional aziridines can be prepared as shown below, steps A and B being the procedure described in U.S. Pat. No. 4,382,135—Sinka et al, May 3, 1983.

A. Preparation of Alkoxylated Polyols

The specified monomer base is charged to a reaction flask equipped with stirrer, thermometer and gas inlet pipes and heated to melt product if necessary. Once product is uniform, it is heated to 50°–140° C. where the catalyst, caustic potash, is added. Concentration of catalyst ranges from 0.1–0.3 percent by weight of charge, depending whether ethoxylation or propoxylation is conducted and the type of chain structure. Branched chains and products using propylene oxide usually require higher levels of catalyst. To this mixture, ethylene oxide, propylene oxide or mixture of both is added slowly until the product obtains final specifications, optionally under an inert atmosphere such as nitrogen. In some instances, the product must be stripped first under vacuum before alkoxylation to remove any water in base monomer.

B. Preparation of Acrylates of Alkoxylated Polyols

The alkoxylated monomer of part A is azeotropically esterified with 20–55 percent by weight of acrylic acid and 1.5–2.5 percent by weight of p-toluene sulfonic acid, both based on the weight of the alkoxylated monomer in the presence of 20–45 percent by weight of toluene based on the weight of the total charge. Concentration of ingredients varies depending on degree of esterification desired (mono, di or tri) and on the particular reactivity of the alkoxylated monomer. Inhibitors such as methylene blue, phenothiazine, cuprous oxide, copper powder, nitrobenzene and triphenyl phosphite, generally in amounts of from about 0.05% to about 1.0% by weight of the total charge are added during the reaction to inhibit polymerization of product. The reaction is continued until no further water is isolated. The product is then washed and neutralized with sodium carbonate. Paramethoxyphenol is added (700 ppm–3500 ppm) and the toluene distilled off in vacuo (final pressure is about 28 inches of mercury, final temperature of reaction is about 100° C.). The product is filtered for clarity.

C. Preparation of Aziridine Derivatives of the Acrylates of Alkoxylated Polyols A Michael-type addition of ethylene imine to the acrylate of the alkoxylated polyol of Part B above is carried out.

A calculated amount of ethylene imine is weighed into a flask equipped with stirring rod, cooling means, nitrogen source and condenser. The acrylate of the alkoxylated polyol of part B is added in two stages. It is slowly added to the ethylene imine so that the exotherm is maintained at 50° C. Temperature is controlled by varying rate of addition and cooling. On completion of the reaction as evidenced by a stable ethylene imine analysis, a second portion of the acrylate of the alkoxylated polyol is added to consume excess ethylene imine. This is ensured by providing a slight excess of the acrylate ester (1.005 times the calculated requirement). A temperature of 50° C. is maintained until the ethylene imine content is 10 ppm or less.

Coating Compositions

The foregoing aziridines are useful as crosslinking agents in various coating compositions or systems which contain crosslinkable, carboxylated polymers which can be homopolymers or copolymers (two or more comonomers). These systems can be both water based and solvent based. They are conventional and well known and the invention is not to be limited to any specific composition.

These systems generally have a solids content of about 10 to about 80 percent by weight of the total. Useful crosslinkable carboxylated polymers for water based and solvent based systems are carboxylated SBR; carboxylated polyesters such as condensation products of isophthalic acid/pentaerythritol/trimellitic anhydride; epoxy esters such as polyvinyl acetate; styrene acrylic copolymers; alkyd resins such as condensation products of tall oil fatty acid/glycerine/phthalic anhydride (50/40/10 parts by weight); acrylic latices such as methyl methacrylate/butyl acrylate/acrylic acid latex (70/24/6 parts by weight) and styrene/butyl acrylate/acrylic acid latex (50/48/2 parts by weight); vinyl acrylic copolymer latices such as vinyl acetate/butyl acrylate/methacrylic acid (70/26/4 parts by weight) latex and acrylic urethanes. The polymers are present in an amount of from about 5 to about 60 percent by weight of the total.

Useful solvents for solvent based systems are aromatics such as toluene and xylene; aliphatics such as mineral spirits; acetates such as butyl acetate; ketones such as methylethyl ketone, methylisobutyl ketone and acetone; and other oxygenated solvents such as ethylene glycol or mono butyl ether.

The crosslinking agents of this invention are present in an amount of from about 0.2 percent to about 10.0 percent, preferably from about 0.2% to about 3.0%, by weight of the total. The pH of the coatings is maintained at greater than 7.0 by use of a volatile amine such as triethylamine, ammonia, dimethyl ethanolamine, etc.

Ancillary ingredients such as pigments, e.g., titanium dioxide, red iron oxide and phthalocyanine blue, fillers, e.g., talc, silica, calcium carbonate, pigment dispersing agents, defoamers and bactericides can be present.

The coating systems are prepared as follows.

Polymer is weighed into a vessel. A high speed mixer such as a Cowles dissolver is placed in the liquid polymer and agitation is started at a speed of 3000–4000 ft./min. Additives such as dispersant, defoamer and neutralizing agent are added and mixed thoroughly. Pigments, such as titanium dioxide, silica, talc, etc. are then added and mixed at high speed until dispersed to a maximum particle size of 25 microns. Mixing speed is then reduced to 500–1000 ft./min. The term ft./min. is revolutions per minute of the mixing shaft multiplied by the diameter of the mixing blade multiplied by 3.1416 (pi). The remaining ingredients of the formula are then added, preferably in the order of polymer, other additives and diluent and mixed for one hour. The finished coating is then stored in a sealed container until use.

The coating systems can be applied to the following substrates: steel, structural plastics, wood, zinc, aluminum and other ferrous and non-ferrous substrates and are applied by spray, dip, roll coat, brush and similar procedures. Curing is achieved by heat provided by hot air, convection or infra red ovens or by air drying.

For a fuller understanding of this invention, reference may be made to the following examples. These examples are given merely to illustrate the invention and are not to be construed in a limiting sense.

EXAMPLE I (A) Preparation of propoxylated neopentyl glycol with a degree of propoxylation of 2

44.8 grams of neopentyl glycol were charged to a reaction flask equipped with stirrer, thermometer and gas inlet pipes and reacted at 130° C. with 55 grams of propylene oxide and 0.2 gram caustic potash under nitrogen until the final mixture was a clear light liquid with a hydroxyl number of 483–490 and a gardner color of 2.

(B) Preparation of the diacrylate of the propoxylated neopentyl glycol obtained in part A above 67.05 grams of the propoxylated neopentyl glycol with a degree of propoxylation of 2 prepared in part A above were azeotropically esterified with 45.8 grams of acrylic acid in 38.44 grams of toluene in the presence of 2.5 grams of p-toluene sulfonic acid and inhibitors until no more water could be isolated. On completion, the product was washed, neutralized with sodium carbonate and toluene distilled off in vacuo at 80° C. The product was filtered. The final mixture was a clear yellow liquid having a gardner color of 3, a viscosity of 22 cps. (Brookfield viscometer at 25° C.), an acid number less than 0.5 and a maximum hydroxyl number of 20.

(C) Preparation of the aziridine derivative of Part B 119.6 grams of ethylene imine were weighed into a flask equipped with stirring rod, cooling means, nitrogen source and condenser. The diacrylate of part B above was added in two stages. In the first stage 450.2 grams of diacrylate were slowly added to the ethylene imine. The exotherm was maintained at 50° C. Temperature was controlled by varying rate of addition and cooling. On completion of the reaction, a second portion of the diacrylate of part B, viz., 56.2 grams was added. A temperature of 50° C. was maintained until the ethylene imine was less than 10 ppm.

EXAMPLE II (A) Preparation of ethoxylated bisphenol A with a degree of ethoxylation of 4

27.0 grams of bisphenol A were charged to a reaction flask equipped with a stirrer, thermometer and gas inlet pipes and heated to 50° C. Then 0.4 gram of sodium methylate was added with agitation and nitrogen sparge. Then 39.0 grams of ethylene oxide were added slowly at 90°–100° C. On completion, the product was stirred and cooled to 50° C. under nitrogen blanket. The final product had a Gardner color of 1 and hydroxyl value of 265.

(B) Preparation of the diacrylate of the ethoxylated bisphenol A obtained in part (A) above 78.0 grams of the ethoxylated bisphenol A with a degree of ethoxylation of 4 were azeotropically esterified with 29.5 grams of glacial acrylic acid in 29.9 grams of toluene in the presence of 1.86 grams of p-toluene sulphonic acid and inhibitors, until no more water could be isolated. On completion, the product was washed, neutralized with caustic soda and toluene distilled off in vacuo at 80° C. The product was filtered, giving a clear liquid having a viscosity of 1200 cps. (Brookfield viscometer at 25° C.), a hydroxyl number of <10 and an acid number of <0.5.

(C) Preparation of the aziridine of Part B 77.6 grams of ethylene imine were weighed into a flask equipped with stirring rod, cooling means, nitrogen source and condenser. The diacrylate of part B above was added in two stages. In the first stage 448.0 grams of diacrylate were slowly added to the ethylene imine and the exotherm maintained at 50° C. Temperature was controlled by varying rate of addition and cooling. On completion of the reaction, a second portion of the diacrylate of part B, viz., 55.1 grams was added. A temperature of 50° C. was maintained until the ethylene imine was less than 10 ppm.

EXAMPLE III (A) Preparation of ethoxylated trimethylolpropane with a degree of ethoxylation of 3

55.56 grams of trimethylolpropane were charged to a reaction flask equipped with a stirrer, thermometer and gas inlet pipes and heated to 60° C. Then 0.9 gram of sodium methylate was added with agitation and nitrogen sparge. Then 43.99 grams of ethylene oxide were added slowly. On completion, the product was stirred and cooled to 50° C. under nitrogen blanket. The catalyst was neutralized with 0.22 gram of acetic acid. The final product had a Gardner color of 2 and hydroxyl value of 680–700.

(B) Preparation of the triacrylate of the ethoxylated trimethylol propane obtained in part (A) above 60.35 grams of the ethoxylated trimethylolpropane with a degree of ethoxylation of 3 were azeotropically esterified with 55.4 grams of glacial acrylic acid in 43.8 grams of toluene in the presence of 3.8 grams of p-toluene sulphonic acid and inhibitors until no more water could be isolated. On completion, the product was washed, neutralized with sodium carbonate and toluene distilled off in vacuo at 80° C. The product was filtered, giving a clear liquid having a viscosity of 70 cps (Brookfield viscometer at 25° C.), a hydroxyl number of 20 and an acid number of 0.5.

(C) Preparation of the aziridine derivative of Part B 133.6 grams of ethylene imine were weighed into a flask equipped with stirring rod, cooling means, nitrogen source and condenser. The triacrylate of part B above was added in two stages. In the first stage 450.0 grams of diacrylate were slowly added to the ethylene imine and the exotherm maintained at 50° C. Temperature was controlled by varying rate of addition and cooling. On completion of the reaction, a second portion of the triacrylate of part B, viz., 42.3 grams was added. A temperature of 50° C. was maintained until the ethylene imine was less than 10 ppm.

EXAMPLE IV (A) Preparation of propoxylated trimethylol propane with a degree of propoxylation of 3

43.6 grams of trimethylol propane were charged to a reaction flask equipped with a stirrer, thermometer, gas inlet pipes and heated to 50° C. Then 0.2 gram of caustic potash was added with agitation and nitrogen sparge. Then 56 grams of propylene oxide were added slowly at 85°–90° C. After a hydroxyl value of 550–560 was reached, stirring of the reaction mixture was continued for an additional three hours. On completion, the product was cooled to 80° C., the catalyst neutralized with phosphoric acid and filtered.

(B) Preparation of the triacrylate of the propoxylated trimethylol propane obtained in part (A) above 58.7 grams of the propoxylated trimethylolpropane with a degree of propoxylation of 3 were azeotropically esterified with 45.3 grams of glacial acrylic acid in 29.0 grams of toluene in the presence of 3.58 grams of p-toluene sulphonic acid and inhibitors, until no more water could be isolated. On completion, the product was washed, neutralized with sodium carbonate and toluene distilled off in vacuo at 80° C. The product was filtered, giving a clear liquid having a viscosity of 85 cps. (Brookfield viscometer at 25° C.), a hydroxyl number of 45 and an acid number of <0.6.

(C) Preparation of the aziridine of part (B)

121.9 grams of ethylene imine were weighed into a flask equipped with stirring rod, cooling means, nitrogen source and condenser. The triacrylate of part B above was added in two stages. In the first stage 445.5 grams of triacrylate were slowly added to the ethylene imine and the exotherm maintained at 50° C. Temperature was controlled by varying rate of addition and cooling. On completion of the reaction, a second portion of the triacrylate of part B, viz., 49.1 grams was added. A temperature of 50° C. was maintained until the ethylene imine was less than 10 ppm.

EXAMPLE V

(A) Preparation of propoxylated pentaerythritol with a degree of propoxylation of 4.7

136 grams of pentaerythritol were charged to a reaction flask equipped with a stirrer, thermometer and gas inlet pipes and heated to 85° C. Then 0.3 grams of sodium methylate was added with agitation and nitrogen sparge. Then 273 grams of propylene oxide were added slowly. On completion, the product was stirred under nitrogen blanket. The catalyst was neutralized with 0.4 grams of acetic acid. The final product had a Gardner color of 1 and hydroxyl value of 550.

(B) Preparation of the triacrylate of the propoxylated pentaerythritol obtained in part (A) above 75.3 grams of the propoxylated pentaerythritol with a degree of propoxylation of 4.7 were azeotropically esterified with 41.1 grams of glacial acrylic acid in 38.8 grams of toluene in the presence of 3.1 grams of p-toluene sulphonic acid and inhibitors, until no more water could be isolated. On completion, the product was washed, neutralized with sodium carbonate and toluene distilled off in vacuo at 80° C. The product was filtered, giving a clear liquid having a viscosity of 350-450 cps. (Brookfield viscometer at 25° C.), a hydroxyl number of 85-112 and an acid number of 4.

(C) Preparation of the aziridine of part B 278.8 grams of ethylene imine were weighed into a flask equipped with stirring rod, cooling means, nitrogen source and condenser. The triacrylate of part B above was added in two stages. In the first stage 1000.4 grams of triacrylate were slowly added to the ethylene imine and the exotherm was maintained at 50° C. Temperature was controlled by varying rate of addition and cooling. On completion of the reaction, a second portion of the triacrylate of part B, viz., 223.7 grams, was added. A temperature of 50° C. was maintained until the ethylene imine was less than 10 ppm.

EXAMPLE VI

(A) Preparation of propoxylated glycerol with a degree of propoxylation of 3.8

29.7 grams of glycerol were charged to a reaction flask equipped with a stirrer, thermometer and gas inlet pipes. 0.3 gram of caustic potash was then added and entire mixture heated to 90°-95° C. Then 70.3 grams of propylene oxide were slowly added with agitation until completely reacted. On completion, the product was cooled to 70° C. under nitrogen blanket. The catalyst was neutralized with 0.4 grams of phosphoric acid. The final product had a Gardner color of 2 and hydroxyl value of 540-550.

(B) Preparation of the triacrylate of the propoxylated glycerol obtained in part (A) above 66.9 grams of the propoxylated glycerol with a degree of propoxylation of 3.8 were azeotropically esterified with 50.9 grams of glacial acrylic acid in 45.9 grams of toluene in the presence of 4.8 grams of p-toluene sulphonic acid and inhibitors, until no more water could be isolated. On completion, the product was washed, neutralized with sodium carbonate and toluene distilled off in vacuo at 80° C. The product was filtered, giving a clear liquid having a viscosity of 70-90 cps. (Brookfield viscometer at 25° C.), a hydroxyl number of 30 and an acid number of 1.0.

(C) Preparation of the aziridine of part B 132.3 grams of ethylene imine were weighed into a flask equipped with stirring rod, coating means, nitrogen source and condenser. The triacrylate of part B above was added in two stages. In the first stage 468.7 grams of triacrylate was slowly added to the ethylene imine and the exotherm was maintained at 50° C. Temperature was controlled by varying rate of addition and cooling. On completion of the reaction, a second portion of the triacrylate of part B, viz., 61.0 grams, was added. A temperature of 50° C. was maintained util the ethylene imine was less than 10 ppm.

The following table sets forth particular properties of the polyfunctional aziridines of the preceeding examples.

TABLE IA

| Poly-Functional Aziridine Ex. No. | Visc. at 25° C. (cps) | Color (Gardner) | Density at 25° C. (gms/cc) | Water Content (% by wt.) | Refr. Index at 25° C. | Freezing Point (°F.) | Flash Point* (°F.) | Surface Tension (Dynes) |
|---|---|---|---|---|---|---|---|---|
| I | 35 | .3 | 0.99 | 0.03 | 1.4614 | −22 | 218 | 50.3 |
| II | 2,600 | 4 | 1.14 | 0.03 | 1.5344 | −40 | 196 | 59.6 |
| III | 1,000 | 6 | 1.12 | 0.06 | 1.4820 | −40 | 205 | 56.7 |
| IV | 600 | 4 | 1.07 | 0.1 | 1.4738 | −16.6 | 201 | 52 |
| V | 740 | 3 | 1.09 | — | 1.4766 | −18 | 212 | 49.2 |
| VI | 200 | 6 | 1.09 | 0.05 | 1.4728 | −22 | 205 | 57.3 |

*Pensky-Martens closed cup

TABLE I B

| Poly-Functional Aziridine Ex. No. | Hexane | Isopropyl Alcohol:Aziridine (1:1) | Water (grams) |
|---|---|---|---|
| I | Insoluble | Soluble (clear) | 8° |
| II | Insoluble | Soluble (clear) | 10* |
| III | Insoluble | Soluble (clear) | 20* |
| IV | Insoluble | Soluble (clear) | 12* |
| V | Insoluble | Soluble (clear) | 51** |
| VI | Insoluble | Soluble (clear) | >200 |

*Grams aziridine added to 100 grams water before sample begins to come out of solution.
**Solution still clear; aziridine addition stopped.

The performance of the polyfunctional aziridines of Examples I, III, IV and VI were evaluated along with the tris aziridine which is the reaction product of propylene imine and trimethylol propane, 40% by weight of solids, (hereinafter identified as TMPTA/PI) and the tris aziridine which is the reaction product of ethylene imine and pentaerythritol triacrylate (hereinafter identified as PETA/EI) in an acrylic based latex baking enamel and in an acrylic urethane latex baking enamel. The specific polyfunctional aziridines, quantities and type of latex baking enamel are shown in Table I below.

TABLE II

| Poly-<br>Functional<br>Aziridine | % Polyfunctional Aziridine on Wt. of Latex Baking Enamel | |
|---|---|---|
| | Acrylic Latex Enamel | Acrylic Urethane Latex Enamel |
| TMPTA/PI | 2.3 | 2.3 |
| PETA/EI | 0.9 | 0.9 |
| Example IV | 0.9 | |
| Example VI | 0.9 | |
| Example III | 0.9 | 0.9 |
| Example I | 0.9 | 0.9 |

The baking enamels had the following compositions and were prepared as follows.

A. Acrylic Latex Baking Enamel

The following materials in the quantities indicated were used.

| Components | Amount (gms.) |
|---|---|
| NeoCryl A-622 (a carboxylated styrene acrylic polymer latex, 32% by wt. solids, pH = 8.2 and viscosity at 25° C. = 300 cps) Polyvinyl Chemical Industries | 781.5 |
| Sodium salt of polyacrylic acid (dispersant), 25% by wt. solids | 3.7 |
| Defoamer | 0.9 |
| Titanium dioxide (pigment) | 169.8 |
| Ammonia (28% by wt. aq. soln.) | 0.9 |
| Defoamer | 2.0 |
| Silicone slip agent | 2.0 |
| Silicone wetting agent | 0.3 |
| Ammonium benzoate (10% by wt. aq. soln.) | 8.2 |
| Water | 30.7 |
| Total | 1000.0 |

To prepare the enamel, 305.8 grams of the first component (latex) and the second, third, fourth and fifth components were mixed together and dispersed at high speed using a variable speed high shear mixer for 20–30 minutes. Then the remaining amount of the first component and the remaining components were added and mixed at a reduced mixer speed for one hour.

To 1,000 gram portions of the foregoing, the following polyfunctional aziridines were added in the amounts shown by slow speed mixing.

| Polyfunctional Aziridine | Amount gms./1000 gms. of enamel |
|---|---|
| TMPTA/PI | 23.0 |
| PETA/EI | 9.0 |
| Example IV | 9.0 |
| Example VI | 9.0 |
| Example III | 9.0 |
| Example I | 9.0 |

The resulting enamels were applied to phosphated steel panels of 4 inches × 12 inches size by air spraying and the coated panels were then baked at 180° F. for twenty minutes.

B. Acrylic Urethane Latex Baking Enamel

The following materials in the quantities indicated were used.

| Components | Amount (gms.) |
|---|---|
| NeoCryl A-601 (a carboxylated methylmethacrylate/butyl methacrylate copolymer latex, 32 ± 1% by wt. solids, pH = 7.5-8.0, viscosity at 25° C. = 100 cps) Polyvinyl Chemical Industries | 103.9 |
| Titanium dioxide (pigment) | 103.9 |
| Sodium salt of polyacrylic acid (dispersing agent), 25% by wt. solids | 0.3 |
| Defoamer | 0.3 |
| NeoRez R-960 (an aliphatic carboxylated polyester urethane latex polymer, 34 ± 1% by wt. solids, pH = 7.5-8.5 and viscosity at 25° C. = 400-800 cps) Polyvinyl Chemical Industries | 78.0 |
| Deionized water | 41.5 |
| FC-430, 10% by wt. aq. soln. (fluorocarbon wetting agent) - 3 M | 2.1 |
| Total | 1000.0 |

To prepare the enamel, the first four components were mixed together and ground in a pebble mill to a 7+(Hegman) fineness of grind. Then the remaining components were added and mixed at a reduced mixer speed for one hour.

To 1,000 gram portions of the foregoing, the following polyfunctional aziridines were added in the following amounts by slow speed mixing.

| Polyfunctional Aziridine | Amount gms./1000 gms. of enamel |
|---|---|
| TMPTA/PI | 23.0 |
| PETA/EI | 9.0 |
| Example III | 9.0 |
| Example I | 9.0 |

The resulting enamels were applied to phosphated steel panels of 4 inches × 12 inches by air spraying and the coated panels were then baked at 200° F. for ten minutes.

Tests

The tests used in collecting the data herein are described below.

| Test | Procedure |
|---|---|
| Opacity | ASTM D-2805, 3 mil drawdown. |
| Gloss - 60° | ASTM D-523 |
| Gloss Retention | Expose cured panel to UV light for 2 weeks. Determine gloss change by ASTM D-523. |
| Color Retention | Expose cured panel to UV light for 2 weeks. Determine whiteness change. Per ASTM E-313. |
| Adhesion | ASTM D-3359 |
| To Steel | |
| Intercoat | Cure coating. Apply second coat to itself and cure. Determine intercoat adhesion using ASTM D-3359. |
| Water Resistance | ASTM D-870 |
| Alkali Resistance | ASTM D-1308 (5% NaOH). |
| Acid Resistance | ASTM D-1308 (10% HCl). |
| Salt Fog Resistance | ASTM B-117 |
| Humidity Resistance | ASTM D-2247 |

Test Results

The test data are shown in Tables III and IV. In those tests which were subjective, the observations made were scored using the ASTM Standardized Scoring Scheme as follows:

| Score | Performance | or | Effect |
|---|---|---|---|
| 10 | Perfect | | None |
| 9 | Excellent | | Trace |
| 8 | Very good | | Very slight |
| 6 | Good | | Slight |
| 4 | Fair | | Moderate |
| 2 | Poor | | Considerable |
| 1 | Very poor | | Severe |
| 0 | No value | | Complete failure |

No data is recorded with respect to a number of properties, i.e., viscosity, pot life, ease of application, foam and cratering, whiteness index, opacity, hardness, wear index, color acceptance, color development and stain removal where the polyfunctional aziridines of Examples I, III, IV and VI demonstrated essentially equivalent performance with respect to TMPTA/PI and PETA/EI.

TABLE III

| | Acrylic Latex Baking Enamel | | | | | |
|---|---|---|---|---|---|---|
| Polyfunctional Aziridine | TMPTA/PI | PETA/EI | Ex. IV | Ex. VI | Ex. III | Ex. I |
| Opacity (%) | 93.3 | 92.7 | 89.3 | 92.6 | 93.6 | 92.0 |
| Gloss - 60° | | | | | | |
| Initial (%) | 84 | 77 | 83 | 79 | 76 | 80 |
| 2 wks UV exposure (%) | 68 | 65 | 74 | 65 | 61 | 86 |
| Change (%) | 19.0 | 15.6 | 10.8 | 17.7 | 19.7 | 7.5 |
| Adhesion | | | | | | |
| To Steel (%) | 75 | 25 | 85 | 75 | 0 | 85 |
| Intercoat (%) | 100 | 100 | 100 | 100 | 90 | 85 |
| Water Resistance (Hrs) | 600 | 600 | 750 | 600 | 168 | 750 |
| Blistering (ASTM) | 9MD | 9MD | 10 | 9MD | 9D | 10 |
| Color Change (Score) | 10 | 10 | 10 | 10 | 10 | 10 |
| Gloss Change (Score) | 10 | 10 | 10 | 10 | 10 | 10 |
| Hardness (Score) | 4 | 10 | 10 | 10 | 1 | 10 |
| 1 Day Recovery (Score) | 10 | 10 | 10 | 10 | 10 | 10 |
| NaOH Resistance 5% (Hrs) | 6 | 2 | 6 | 2 | 2 | 8 |
| Blistering (ASTM) | 8M | 8MD | 8MD | 9MD | 8MD | 8MD |
| Color Change (Score) | 10 | 10 | 10 | 10 | 10 | 10 |
| Gloss Change (Score) | 10 | 10 | 10 | 10 | 10 | 10 |
| Hardness (Score) | 1 | 1 | 1 | 1 | 1 | 1 |
| 1 Day Recovery (Score) | 10 | 10 | 10 | 10 | 10 | 10 |
| HCl Resistance 10% (Hrs) | 750 | 750 | 750 | 48 | 168 | 168 |
| Blistering (ASTM) | 8F | 9D | 9D | 9MD | 9MD | 9MD |
| Color Change (Score) | 10 | 10 | 10 | 10 | 10 | 10 |
| Gloss Change (Score) | 4 | 2 | 2 | 6 | 6 | 6 |
| Hardness (Score) | 10 | 1 | 1 | 1 | 1 | 1 |
| 1 Day Recovery (Score) | 10 | 10 | 10 | 10 | 10 | 10 |
| Salt Fog Resistance (hrs) | 300 | 168 | 300 | 250 | 144 | 300 |
| Blistering (ASTM) | 4F | 2D | 2D | 4D | 4D | 2D |
| Corrosion (Score) | 6 | 8 | 6 | 8 | 8 | 2 |
| Humidity Resistance (Hrs) | 168 | 300 | 300 | 300 | 300 | 300 |
| Blistering (ASTM) | 8MD | 9MD | 9M | 9M | 9MD | 9F |
| Color Change (Score) | 10 | 10 | 10 | 10 | 10 | 10 |
| Gloss Change (Score) | 10 | 10 | 10 | 10 | 10 | 10 |

F = Fine
M = Medium
MD = Medium dense
D = Dense

TABLE IV

| | Acrylic Urethane Latex Baking Enamel | | | |
|---|---|---|---|---|
| Crosslinking Agent | TMPTA/PI | PETA/EI | Ex. III | Ex. I |
| Water Resistance - 20 Hours | | | | |
| Blistering (ASTM) | 8D | 4MD | 6D | 6D |
| Color Change (Score) | 10 | 10 | 10 | 10 |
| Gloss Change (Score) | 10 | 10 | 10 | 10 |
| Hardness (Score) | 6 | 6 | 6 | 6 |
| 1 day recovery (Score) | 10 | 10 | 10 | 10 |
| NaOH Resistance 5% (Hrs) | 550 | 100 | 100 | 100 |
| Blistering (ASTM) | 2F | Lifted | Lifted | * |
| Color Change (Score) | 8 | 6 | 6 | 6 |
| Gloss Change (Score) | 4 | X | X | 4 |
| Hardness (Score) | 10 | | | |
| 1 day recovery (Score) | 10 | | | 4 |
| HCl Resistance 10% (Hrs) | 550 | 300 | 550 | 550 |
| Blistering (ASTM) | 10 | 4D | 4F | 4F |
| Color Change (Score) | 10 | 10 | 10 | 10 |
| Gloss Change (Score) | 10 | 8 | 10 | 10 |
| Hardness (Score) | 6 | 1 | 6 | 6 |
| 1 day recovery (Score) | 10 | 10 | 10 | 10 |
| Salt Fog Resistance (Hrs) | 300 | 200 | 300 | 300 |
| Blistering (ASTM) | 4M | 4D | 6D | 6MD |
| Corrosion (Score) | 8 | 4 | 6 | 6 |

*Cracking & Checking occurred.
F = Fine
M = Medium
MD = Medium dense

D = Dense
X = Not evaluated

From the foregoing data, the following can be concluded.

Overall, the polyfunctional aziridines of this invention provide superior properties in gloss, adhesion, ultraviolet light stability, alkali resistance, moisture resistance and corrosion resistance.

The data in Table III concerning the acrylic latex enamel indicate that coatings containing the polyfunctional aziridines of Examples I and IV yielded a lesser percentage change in gloss after two weeks of UV exposure than coatings containing the prior art TMPTA/PI and PETA/EI polyfunctional aziridines, thus demonstrating superior ultraviolet stability. In addition, Examples III and VI provided approximately the same % change in gloss as the prior art.

In adhesion to steel (Table III), coatings containing the polyfunctional aziridines of Examples I, IV and VI had 10% more adhesion than coatings containing TMPTA/PI. Furthermore, coatings containing the polyfunctional aziridines of Examples I, IV and VI had a vastly significient improvement, i.e., 50% to 60% better adhesion, compared to coatings containing the PETA/EI product.

With respect to water resistance (Table III), coatings containing the polyfunctional aziridines of Examples I and IV did not blister after 750 hours, whereas coatings containing TMPTA/PI and PETA/EI blistered after only 600 hours. Coatings containing the polyfunctional aziridine of Example VI were equivalent to the prior art in water resistance.

Results from the salt-fog test (Table III), showed that coatings containing the polyfunctional aziridines of Examples I, IV and VI went longer hours before blistering (300, 300, 250 hours) than coatings containing PETA/EI (168 hours).

The humidity resistance test (Table III), indicated that compared to prior art examples, coatings containing the polyfunctional aziridines of Examples I, III, IV and VI provided a longer period before blistering occurred. In addition, the blisters that did form on coated panels containing the polyfunctional aziridines of Examples I, III, IV and VI were of finer dimension than prior art examples, thus demonstrating superior performance.

While the invention has been described with reference to certain specific embodiments thereof, it is understood that it is not to be so limited since alterations and changes may be made therein which are within the full intended scope of the appended claims.

What is claimed is:

1. In a coating composition selected from the group consisting of aqueous and solvent based coating compositions containing crosslinkable carboxylated polymer and at least one polyfunctional aziridine crosslinking agent, the improvement comprising the presence of at least one polyfunctional aziridine crosslinking agent which is the reaction product of (1) ethylene imine and (2) acrylates of alkoxylated polyols selected from the group consisting of trimethylol propane, neopentyl glycol, pentaerythritol, bis phenol A, bis phenol F and glycerol having from about 2 to about 12 moles of at least one alkylene oxide selected from the group consisting of ethylene oxide and propylene oxide.

2. The composition of claim 1 wherein said polyfunctional aziridine is present in an amount of from about 0.2% to about 10% by weight of the total composition.

3. The composition of claim 1 wherein the alkylene oxide is ethylene oxide.

4. The composition of claim 1 wherein the alkylene oxide is propylene oxide.

5. The composition of claim 3 wherein the polyfunctional aziridine is the tris aziridine of the triacrylate of the adduct of trimethylol propane and about 3 moles of ethylene oxide.

6. The composition of claim 3 wherein the polyfunctional aziridine is the bis aziridine of the diacrylate of the adduct of neopentyl glycol and about 2 moles of ethylene oxide.

7. The composition of claim 3 wherein the polyfunctional aziridine is the bis aziridine of the diacrylate of the adduct of bis phenol A and about 4 moles of ethylene oxide.

8. The composition of claim 4 wherein the polyfunctional aziridine is the tris aziridine of the triacrylate of the adduct of trimethylol propane and about 3 moles of propylene oxide.

9. The composition of claim 4 wherein the polyfunctional aziridine is the bis aziridine of the diacrylate of the adduct of neopentyl glycol and about 2 moles of propylene oxide.

10. The composition of claim 4 wherein the polyfunctional aziridine is the tris aziridine of the triacrylate of the adduct of pentaerythritol and about 4.7 moles of propylene oxide.

11. The composition of claim 4 wherein the polyfunctional aziridine is the tris aziridine of the triacrylate of the adduct of glycerol and about 3.8 moles of propylene oxide.

* * * * *